United States Patent
Trice et al.

(10) Patent No.: US 11,998,134 B2
(45) Date of Patent: Jun. 4, 2024

(54) FULLY SUBMERGIBLE SOUS VIDE DEVICE

(71) Applicant: Midea Group Co., Ltd., Foshan (CN)

(72) Inventors: Daniel J. Trice, Louisville, KY (US);
Robert Digman, Goshen, KY (US);
Paul R. Staun, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 704 days.

(21) Appl. No.: 17/082,699

(22) Filed: Oct. 28, 2020

(65) Prior Publication Data

US 2021/0038013 A1 Feb. 11, 2021

Related U.S. Application Data

(63) Continuation of application No. 15/721,086, filed on Sep. 29, 2017, now Pat. No. 10,827,872.

(51) Int. Cl.
*A47J 27/10* (2006.01)
*A47J 36/32* (2006.01)

(52) U.S. Cl.
CPC .............. *A47J 27/10* (2013.01); *A47J 36/32* (2013.01); *A47J 36/321* (2018.08)

(58) Field of Classification Search
CPC .. A47J 27/00; A47J 27/62; A47J 43/28; A47J 36/00; A47J 44/00; A47J 36/32
See application file for complete search history.

(56) References Cited

U.S. PATENT DOCUMENTS

| | | | |
|---|---|---|---|
| 6,075,463 A | 6/2000 | Wauer | |
| 6,698,923 B2 | 3/2004 | Bedetti et al. | |
| 7,520,670 B2 | 4/2009 | Schwegman | |
| 9,191,998 B2 | 11/2015 | Hegedis et al. | |
| 9,603,477 B2 | 3/2017 | Hoare et al. | |
| 9,615,689 B2 * | 4/2017 | Plazarte | B65B 7/06 |
| 10,022,008 B1 * | 7/2018 | Staton | A47J 27/004 |
| 10,163,326 B1 * | 12/2018 | Billman | G06K 19/0723 |
| 2010/0263458 A1 | 10/2010 | Irving | |

(Continued)

FOREIGN PATENT DOCUMENTS

| | | |
|---|---|---|
| CN | 105310462 A | 2/2016 |
| CN | 106580053 A | 4/2017 |

(Continued)

OTHER PUBLICATIONS

"Precision Cooking Probe" www.geappliancesparts.com. Retrieved on May 29, 2017.

(Continued)

*Primary Examiner* — Nathaniel E Wiehe
*Assistant Examiner* — Spencer H. Kirkwood
(74) *Attorney, Agent, or Firm* — Gray Ice Higdon

(57) ABSTRACT

A sous vide device and method of using the same may include a body that is fully submergible in a container of water and may wirelessly communicate with an external device, e.g., to control an external heating element during sous vide cooking. Further, a sous vide device may include a rechargeable battery capable of being wirelessly recharged from a charging dock. In addition, a sous vide device may include a moisture sensor for use in changing the activation state of a heating element and/or a turbidity sensor for use in changing the activation state of a water circulator of the sous vide device.

20 Claims, 6 Drawing Sheets

(56) References Cited

U.S. PATENT DOCUMENTS

| | | | |
|---|---|---|---|
| 2012/0156997 A1* | 6/2012 | Kim | G06F 3/017 |
| | | | 455/41.2 |
| 2013/0220143 A1 | 8/2013 | Fetterman et al. | |
| 2014/0348987 A1 | 11/2014 | Cheng et al. | |
| 2015/0335192 A1 | 11/2015 | Plazarte et al. | |
| 2015/0336806 A1 | 11/2015 | Mahato | |
| 2015/0342388 A1 | 12/2015 | Wu | |
| 2015/0351579 A1 | 12/2015 | Johncock et al. | |
| 2016/0036241 A1* | 2/2016 | Eckerson | H05B 6/1236 |
| | | | 307/104 |
| 2016/0072338 A1* | 3/2016 | Makwinski | H02J 7/0042 |
| | | | 320/108 |
| 2016/0192801 A1 | 7/2016 | Wu | |
| 2016/0196739 A1 | 7/2016 | Naber et al. | |
| 2016/0209077 A1 | 7/2016 | Wu | |
| 2016/0296163 A1 | 10/2016 | Chaudhry et al. | |
| 2017/0089768 A1 | 3/2017 | Wu et al. | |
| 2018/0073744 A1* | 3/2018 | Ji | F24C 15/105 |
| 2019/0124722 A1* | 4/2019 | Young | H05B 3/42 |

FOREIGN PATENT DOCUMENTS

| | | | |
|---|---|---|---|
| EP | 2950612 A1 | 2/2015 | |
| EP | 3158898 A1 | 4/2017 | |
| KR | 20130093923 A | 8/2013 | |
| WO | WO-2013000790 A1 * | 1/2013 | ........... A23L 1/0121 |
| WO | WO2013000790 A1 | 1/2013 | |
| WO | WO2017059325 A1 | 4/2017 | |
| WO | WO-2017143224 A1 * | 8/2017 | .............. A47J 27/62 |

OTHER PUBLICATIONS

"Wireless Sensor Syncs a Hot Pot with an Induction Cooktop" http://gizmodo.com. Dated Apr. 17, 2012.
"Paragon Induction Cooktop" www.indiegogo.com/projects/paragon-induction-cooktop. Retrieved on Sep. 29, 2017.
International Search Report and Written Opinion issued in Application No. PCT/CN2018/074219 dated Jun. 22, 2018.

* cited by examiner

FULLY SUBMERGIBLE SOUS VIDE DEVICE

BACKGROUND

Sous Vide cooking has become an increasingly popular manner of cooking, as it has been found that for many foods, sous vide cooking can produce extremely tender, flavorful and consistent results. As opposed to traditional cooking, where a high temperature energy source is used to cook food from the outside until the interior of the food reaches a desired temperature, sous vide cooking involves cooking food at a much lower temperature and generally for a longer period of time. As a result, sous vide cooking is much less susceptible to burning, drying out, or otherwise overcooking the exterior of a food due to the substantially reduced temperature differential between the interior and the exterior of the food during cooking.

Typically, for sous vide cooking, the food to be cooked is placed in a bag, in some instances with spices, marinades or other flavorings. Generally, it is desirable to remove most or all of the air from the bag to minimize the buoyancy of the bag, and in some instances a vacuum sealer is used for this purpose. The bag is then immersed in a container of water (e.g., a pot) heated to a fixed temperature, which in many instances is the desired final internal temperature of the food being cooked. Thus, for example, if it is desired to cook a medium rare steak using sous vide cooking, the water may be held at a temperature of about 130 degrees Fahrenheit. The food is then cooked for sufficient time to bring the food to the same temperature as the water throughout so that the interior of the food cooks at the same temperature as the exterior of the food.

It has been found, however, that sous vide cooking generally requires precise control over the temperature of the water throughout the cooking process, and as a result, various dedicated sous vide cooking devices, also known as immersion cookers, have been developed to address the specific needs of sous vide cooking. A typical sous vide cooking device is designed to clip onto the side of a container such as a pot and includes a heating element, a temperature sensor and a mechanism for circulating water such that a consistent water temperature can be maintained throughout the container. Due to the electrical power requirements of the heating element, a sous vide cooking device generally runs off of AC power, and thus only the portion of the device housing the heating element, temperature sensor and water circulator is immersed in the water. Additional components, such as a display and various user controls are generally positioned at a top of the device and above the level of the water.

Conventional sous vide cooking devices, however, have been found to suffer from a number of drawbacks. For example, the power requirements of the heating element necessitates plugging into a wall outlet, which can be cumbersome and can limit where cooking can be performed if no wall outlets are available. Further, such devices are generally designed only for use in water, and can be fouled and potentially ruined if used to heat other liquids (e.g., creamy soups), not to mention if a bag of food ruptures or leaks during cooking and the contents of the bag mix with the container of water. Still further, whenever a device is clipped to or otherwise hangs on the side of a container or has a power cord, a lid or cover generally cannot be used, which can lead to lower efficiency and water evaporation, which can potentially drop the level of water below the level of the food being cooked.

SUMMARY

The herein-described embodiments address these and other problems associated with the art by providing a sous vide device and method of using the same. In some embodiments, a sous vide device may be fully submergible in a container of water and may wirelessly communicate with an external device, e.g., to control an external heating element during sous vide cooking. Further, in some embodiments, a sous vide device may include a rechargeable battery capable of being wirelessly recharged from a charging dock. In addition, in some embodiments, a sous vide device may include a moisture sensor for use in changing the activation state of a heating element, and in some embodiments, a sous vide device may include a turbidity sensor for use in changing the activation state of a water circulator of the sous vide device.

Therefore, consistent with one aspect of the invention, a sous vide device may include a fully submergible body shaped and configured for full submersion in a container of water during sous vide cooking, the body including a battery, water circulator, and temperature sensor, and a controller disposed within the body, the controller coupled to the temperature sensor and the water circulator and powered by the battery, and where the controller includes a wireless communication circuit, where the controller is configured to actuate the water circulator to circulate water when the body is submerged in the container of water and wirelessly communicate with an external device using the wireless communication circuit.

In some embodiments, the body is puck-shaped. Also, in some embodiments, the body includes one or more protective external surfaces to protect a sink when the body is dumped from the container of water after cooking. Also, in some embodiments, the body includes an external surface and first and second internal cavities, the external surface including one or more ports defined therein, where the first internal cavity is sealed and houses the battery and the controller and the second internal cavity is in fluid communication with the one or more ports, where the temperature sensor is exposed to the second internal cavity to sense a temperature of water within the second internal cavity, and where the water circulator is exposed to the second internal cavity to circulate water through the one or more ports.

Further, in some embodiments, the water circulator includes a pump, and in some embodiments, the water circulator includes rotating blade. Some embodiments may also include a wireless charging circuit disposed in the body such that the battery is wirelessly rechargeable.

In addition, in some embodiments, the controller is configured to wirelessly communicate with the external device using the wireless communication circuit to communicate a water temperature sensed by the temperature sensor to the external device. In some embodiments, the controller is configured to wirelessly communicate with a mobile computing device, a personal computing device, a server or a cloud service. In some embodiments, the controller is configured to wirelessly communicate with a burner controller to regulate an energy output of a burner that heats the container of water, and where the burner and burner controller are disposed in a range, a stovetop, an oven, a grill or a countertop cooking device. In some embodiments, the burner is a gas burner, an electric burner, a microwave element, or an induction burner.

In addition, in some embodiments the body further includes a moisture sensor, where the controller is coupled to the moisture sensor and configured to control activation of the water circulator based in part on moisture sensed by the moisture sensor. In addition, in some embodiments the body further includes a turbidity sensor, where the controller is coupled to the turbidity sensor to disable the water circulator in response to detecting immersion in a non-clear liquid. In some embodiments, the body further includes a visual interface, and the controller is coupled to the visual interface and configured to drive the visual interface to provide feedback to a user. In some embodiments, the controller is configured to drive the visual interface to indicate when the temperature sensor senses a temperature above a predetermined threshold.

Moreover, in some embodiments, the device lacks a heating element. In addition, in some embodiments, the body includes one or more feet configured to support the device on a bottom surface of the container while allowing for water to circulate between the body and the bottom surface.

Consistent with another aspect of the invention, a sous vide cooking method may include fully submerging a sous vide device in a container of water, the sous vide device including a fully submergible body including a temperature sensor and a wireless communication circuit, applying heat to the container of water using a heating element that is external to the container of water, sensing a temperature of the water in the container with the temperature sensor, and wirelessly communicating between the sous vide device and an external device to regulate an output of the heating element based at least in part on the sensed temperature.

Some embodiments may also include circulating the water in the container with a water circulator disposed in the body. In addition, in some embodiments, wirelessly communicating between the sous vide device and the external device includes communicating the sensed temperature to the external device. In some embodiments, wirelessly communicating between the sous vide device and the external device includes communicating a control signal to control the heating element based on the sensed temperature. Moreover, in some embodiments, the external device is a mobile computing device, a personal computing device, a server or a cloud service.

Also, in some embodiments, the heating element includes a burner, where the external device is a burner controller, and where the burner and burner controller are disposed in a range, a stovetop, an oven, a grill or a countertop cooking device. In some embodiments, the heating element includes an inductive heating element, the method further including powering the sous vide device wirelessly using the inductive heating element concurrently with applying heat to the container of water. In addition, in some embodiments the sous vide device further includes a rechargeable battery and the heating element includes an inductive heating element, and the method further includes charging the rechargeable battery of the sous vide device wirelessly via using inductive heating element concurrently with applying heat to the container of water.

Consistent with another aspect of the invention, an apparatus may include a sous vide device including a fully submergible body shaped and configured for full submersion in a container of water during sous vide cooking, the device including a rechargeable battery, a water circulator, a temperature sensor, and a controller, where the controller is coupled to the temperature sensor and the water circulator and is powered by the rechargeable battery, and a charging dock including a wireless charging circuit configured to wirelessly charge the rechargeable battery when the sous vide device is proximate the charging dock.

In addition, some embodiments may further include a cooking appliance, where the charging dock is disposed on the cooking appliance. Moreover, in some embodiments, the cooking appliance includes a stovetop or a range. Further, in some embodiments, the charging dock is disposed on a cooking surface of the cooking appliance. Also, in some embodiments, the charging dock is disposed on a backsplash of the cooking appliance. In some embodiments, the cooking appliance includes a countertop cooking device. Further, in some embodiments, the cooking appliance includes a grill. Further, in some embodiments, the sous vide device is puck-shaped and the charging dock includes a disc-shaped recess sized and configured to support the sous vide device during charging. Some embodiments may also include a burner, and the charging dock is disposed on the burner.

In some embodiments, the burner includes an inductive heating element configured to wirelessly charge the rechargeable battery and/or power the controller of the sous vide device concurrently with heating a container of water within which the sous vide device is submerged. In addition, some embodiments may further include a vacuum sealer, where the charging dock is disposed on a surface of the vacuum sealer. In some embodiments, the charging dock includes a stand-alone housing sized and configured to support the sous vide device while charging.

Consistent with another aspect of the invention, a sous vide device may include a body shaped and configured for immersion in a container of water during sous vide cooking, the body including a water circulator, a moisture sensor and temperature sensor, and a controller disposed within the body, the controller coupled to the temperature sensor, moisture sensor and the water circulator, where the controller is configured to change an activation state of a heating element that heats the container of water in response to the moisture sensor.

In some embodiments, the controller includes a wireless communication circuit, where the heating element is external from the container of water, and where the controller is configured to wirelessly communicate with an external device using the wireless communication circuit to change the activation state of the heating element. Further, in some embodiments, the heating element is a burner, where the external device is a burner controller, and where the burner and burner controller are disposed in a range, a stovetop, an oven, a grill or a countertop cooking device. In some embodiments, the external device is a mobile computing device, a personal computing device, a server or a cloud service. In addition, in some embodiments the body further includes a heating element coupled to and controlled by the controller in response to the temperature sensor. Further, in some embodiments, the controller is configured to change the activation state of the heating element that heats the container of water in response to the moisture sensor by automatically starting a sous vide cooking cycle in response to detection of immersion of the body in the container of water with the moisture sensor.

Also, in some embodiments, the controller is configured to change the activation state of the heating element that heats the container of water in response to the moisture sensor by automatically shutting off the heating element during a sous vide cooking cycle in response to detection of an absence of water in the container with the moisture sensor. In addition, in some embodiments, the controller is configured to notify a user to add water in response to detection of an absence of water in the container with the moisture sensor.

Consistent with another aspect of the invention, a sous vide cooking method may include immersing a sous vide device in a container of water, the sous vide device including a body including a water circulator, a moisture sensor and temperature sensor, applying heat to the container of water using a heating element while circulating water using the water circulator, sensing a temperature of the water in the container with the temperature sensor, and changing an activation state of the heating element in response to the moisture sensor.

In some embodiments the sous vide device further includes a wireless communication circuit, where the heating element is external from the container of water, and where changing the activation state of the heating element includes wirelessly communicating with an external device using the wireless communication circuit. In some embodiments, the heating element is a burner, where the external device is a burner controller, and where the burner and burner controller are disposed in a range, a stovetop, an oven, a grill or a countertop cooking device. In addition, in some embodiments, the external device is a mobile computing device, a personal computing device, a server or a cloud service. Also, in some embodiments, the heating element is disposed in the sous vide device. In addition, in some embodiments, changing the activation state of the heating element includes automatically starting a sous vide cooking cycle in response to detection of immersion of the body in the container of water with the moisture sensor. In addition, in some embodiments, changing the activation state of the heating element includes automatically shutting off the heating element during a sous vide cooking cycle in response to detection of an absence of water in the container with the moisture sensor.

Consistent with another aspect of the invention, a sous vide device may include a body shaped and configured for immersion in a container of liquid during sous vide cooking, the body including a water circulator, a turbidity sensor and temperature sensor, and a controller disposed within the body, the controller coupled to the temperature sensor, turbidity sensor and the water circulator, where the controller is configured to control an activation state of the water circulator in response to the turbidity sensor.

In some embodiments, the controller includes a wireless communication circuit, where the controller is configured to control a heating element that heats the container of liquid and that is external from the container of liquid, and where the controller is configured to wirelessly communicate with an external device using the wireless communication circuit to change an activation state of the heating element in response to the turbidity sensor. Further, in some embodiments, the heating element is a burner, where the external device is a burner controller, and where the burner and burner controller are disposed in a range, a stovetop, an oven, a grill or a countertop cooking device. In addition, in some embodiments, the external device is a mobile computing device, a personal computing device, a server or a cloud service. Further, in some embodiments the body further includes a heating element coupled to and controlled by the controller in response to the temperature sensor, and where the controller is configured change an activation state of the heating element in response to the turbidity sensor. Moreover, in some embodiments, the controller is configured to control the activation state of the water circulator in response to the turbidity sensor by restricting starting of a sous vide cooking cycle in response to detection of a non-clear liquid in the container with the turbidity sensor. Further, in some embodiments, the controller is configured to control the activation state of the water circulator in response to the turbidity sensor by shutting off the water circulator during a sous vide cooking cycle in response to detection of leakage from a bag of food with the turbidity sensor.

Consistent with another aspect of the invention, a sous vide cooking method may include immersing a sous vide device in a container of liquid, the sous vide device including a body including a water circulator, a turbidity sensor and temperature sensor, applying heat to the container of liquid using a heating element while circulating liquid using the water circulator, sensing a temperature of the liquid in the container with the temperature sensor, and controlling an activation state of the water circulator in response to the turbidity sensor.

In some embodiments, the sous vide device further includes a wireless communication circuit, where the heating element is external from the container of liquid, and where the method further includes wirelessly communicating with an external device using the wireless communication circuit to change an activation state of the heating element in response to the turbidity sensor. In some embodiments, the heating element is a burner, where the external device is a burner controller, and where the burner and burner controller are disposed in a range, a stovetop, an oven, a grill or a countertop cooking device. Moreover, in some embodiments, the external device is a mobile computing device, a personal computing device, a server or a cloud service. Further, in some embodiments, the heating element is disposed in the sous vide device, the method further including changing an activation state of the heating element in response to the turbidity sensor. In addition, in some embodiments, controlling the activation state of the water circulator includes restricting starting of a sous vide cooking cycle in response to detection of a non-clear liquid in the container with the turbidity sensor. In addition, in some embodiments, controlling the activation state of the water circulator includes shutting off the water circulator during a sous vide cooking cycle in response to detection of leakage from a bag of food with the turbidity sensor.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
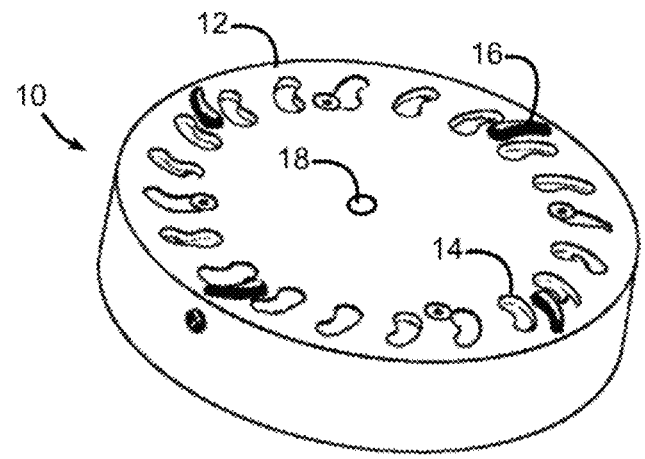
FIG. 1 is a perspective view of a sous vide device consistent with some embodiments of the invention.

Embodiments consistent with the invention are generally directed to a sous vide device and method of using the same capable of facilitating sous vide cooking. In some embodiments, a sous vide device may include a fully submergible body shaped and configured for full submersion in a container of water during sous vide cooking, and including at least a battery, water circulator, and temperature sensor, and with a controller disposed within the body, coupled to the temperature sensor and the water circulator, and powered by the battery. The controller may be configured to actuate the water circulator to circulate water when the body is submerged in the container of water and wirelessly communicate with an external device using the wireless communication circuit, e.g., to communicate a temperature sensed by the temperature sensor and/or to communicate a control signal to control an external heating element that heats the container of water in order to maintain the container water at a controlled temperature.

In some embodiments, for example, a sous vide device may be configured with a puck-shaped body that enables a user to simply drop the device into a pot without any wires, communicate with a phone app and/or cooking device to provide temperature feedback, and have wireless powering of the device through an onboard battery that can be charged with a wireless inductive charger outside the pot. Further, in some embodiments, if the cooking device is equipped with an inductive coil, the sous vide device may even be able to capture power directly from the inductive coil to concurrently charge the battery and/or power the device, and in some instances may negate the need for a battery in the device. Still further, given that the body may be fully submerged in a container of water, a lid or cover may be used if desired.

Further, in some embodiments, the puck-shaped body may be formed from two halves, and having a water tight assembly (e.g., within a chamber formed in the body) including at least a battery, electronics, and water circulator drive (e.g., a fan, pump, or motor). Further, such a device may include a water circulation component such as an impeller, blade or fan), and which may be disposed in another chamber of the body, and in fluid communication with one or more vents or ports to circulate water in the container. In addition, in some embodiments the body of a sous vide device may be ruggedized and have one or more protective external surfaces, e.g., formed of silicon or another pliable material, so that the device can be poured out into a sink and retrieved without damage to the device or the sink at the completion of cooking.

In addition, in some embodiments, a sous vide device may include one or more visual indicators, e.g., one or more LED's on the top and/or bottom surfaces to help communicate status information. For example, a red LED may be used to indicate the device is hot and shouldn't be handled without wearing a protective glove. A blue LED may be used to indicate the device is on and functioning properly. A yellow LED light may be used to indicate a "low power" status, e.g., when 30 minutes or less of battery power remains. Further, the controller may be configured to reserve some power to light the red LED for enough time to allow the product to cool before all power is lost. In other embodiments, one or more of the LED's may be multi-colored LED's such that different status information may be conveyed by the same LED.

Further, in some embodiments, a sous vide device may be used as a stand-alone device that is paired with a mobile computing device, e.g., via an app, and capable of circulating the water and providing temperature feedback during sous vide cooking, with control over the external heating element being handled manually by a user. In other embodiments, the device may effectively be used as a sensor in a closed loop system that provides feedback to a stovetop or range control or stand-alone induction plate for regulating the temperature. In still other embodiments, a closed loop system may be implemented by using a mobile computing device to control a stovetop or range control or stand-alone induction plate, with the mobile computing device in communication with the sous vide device to receive temperature readings therefrom.

In addition, as discussed in greater detail below, a sous vide device may also include in some embodiments a rechargeable battery, and may be used in connection with a charging dock having a wireless charging circuit capable of wirelessly charging the rechargeable battery when the sous vide device is proximate the charging dock. In various embodiments, the charging dock may be a stand-along charging dock, or may be integrated into a cooking appliance such as a hot plate, stovetop, grill or range, or into another device such as a vacuum sealer.

In still other embodiments, one or both of a moisture sensor and a turbidity sensor may be integrated into a sous vide device, including a sous vide device that is not fully submergible and/or includes its own heating element. A moisture sensor may be used, for example, to change the activation state of an internal or external heating element, e.g., to automatically start a sous vide cooking operation when moisture is detected (e.g., when the sous vide device is submerged in a container of water) and/or to shut off or disable a heating element when no moisture is detected (e.g., when the device is not submerged in water or if all of the water in a container has boiled off). A turbidity sensor may be used, for example, to control an activation state of a water circulator, e.g., to disable or shut off the water circulator when a non-clear liquid is detected to protect against fouling of the device. The turbidity sensor may be used, for example, to discourage use of a device in a non-clear liquid such as a soup, or to detect and/or protect the device in situations where a bag of food ruptures or leaks while cooking. In addition, in some embodiments a notification can be sent to a user, e.g., through an app, to notify the user of these and any other abnormal conditions.

Other variations will be apparent to those of ordinary skill in the art having the benefit of the instant disclosure. Therefore, the invention is not limited to the particular embodiments disclosed herein.

Turning now to the drawings, wherein like numbers denote like parts throughout the several views, FIGS. 1-4 illustrate an example sous vide device 10 in which the various technologies and techniques described herein may be implemented consistent with some embodiments of the invention. As will be discussed in greater detail below, sous vide device 10 may, in some embodiments, include a fully submergible body 12 shaped and configured for full submersion in a container of water during sous vide cooking, i.e., when placed in a container have a water level that is higher than the height of the body, the entirety of the body may be submerged in the container of water and located below the top surface of the water. Body 12 may include one or more vents or ports 14 through which water circulates, as well as one or more feet 16 to support body 12 on a flat supporting surface such as a container bottom, as well as to provide some degree of separation between body 12 and the supporting surface to enable water to circulate through vents 14. Vents 14 also assist in sinking device 10 as water is received within the device. In some embodiments, body 12 is puck-shaped, i.e., having the shape of a regular right cylinder and a relatively low profile to enable the body to be fully submerged within a container of water. Moreover, body 12 may include similar vents 14 and feet 16 on the opposing surface of body 12 in some embodiments such that sous vide device 10 may be also used in an inverted orientation.

It will be appreciated, however, that vents may have other configurations in other embodiments, e.g., disposed on the curved perimeter surface of body 12. Moreover, body 12 may have different shapes in other embodiments, e.g., cubes, spheres, cones, and other three dimensional shapes sized and configured for full submersion in a container of water.

Sous vide device 10 may also, in some embodiments, include a user interface 18, e.g., including one or more visible indicators such as one or more LED's, which may be used to communicate status information to a user such as whether the device is still hot, battery status information, power status information, etc. A user interface 18 may also include one or more buttons or other controls in some embodiments to enable a user to turn a device on or off, or to input various cooking parameters in lieu of using a mobile computing device or burner controller.

Figure 2:
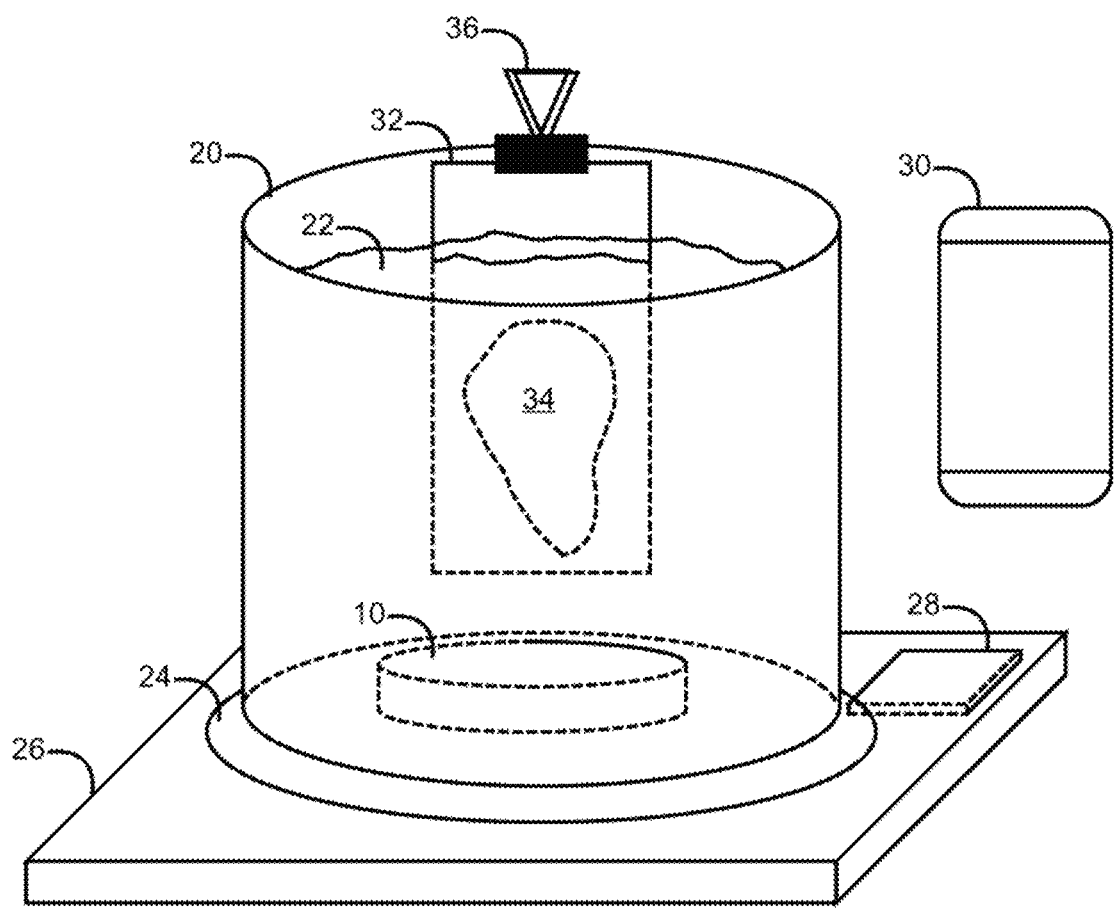
FIG. 2 illustrates the use of the sous vide device of FIG. 1 to perform sous vide cooking.

FIG. 2 illustrates a typical usage scenario for sous vide device 10. In this example, sous vide device 10 is placed in a container 20 such as a pot or pan containing a volume of water 22 such that sous vide device 10 is fully submerged in the water. The container 20 is placed on an external heating element, e.g., a burner 24 of a hot plate or countertop cooking device 26, such that burner 24 may heat water 22 to a controlled temperature. Burner 24 may be an inductive burner, a gas burner, or an electric burner, among other types of heating elements, and is under the control of a burner controller 28, e.g., a controller for countertop cooking device 26. As will become more apparent below, sous vide device 10 may wirelessly communicate with burner controller 28 and/or another device such as a mobile phone 30 to control the amount of energy output by burner 24 and maintain a regulated temperature for the water 22 in container 20 during sous vide cooking.

Generally, during sous vide cooking, one or more food items are placed in container 20 and immersed in water 22. The food items are usually placed bags or otherwise sealed such that the food items do not physically contact or mix with water 22. FIG. 2, for example, illustrates a bag 32 containing a chicken breast 34. In some instances, bags of food items may be allowed to rest within container 20, while in other instances, bags of food items may be clipped or otherwise secured to container 20, e.g., via a clip 36 such that the bags are suspended and do not rest on the bottom of container 20. It is generally desirable for air to be removed from each bag prior to cooking, e.g., using a vacuum sealer or through manual expelling of air from a zippered storage bag prior to closure, to minimize the buoyancy of the bag when immersed in the container of water.

Figure 3:
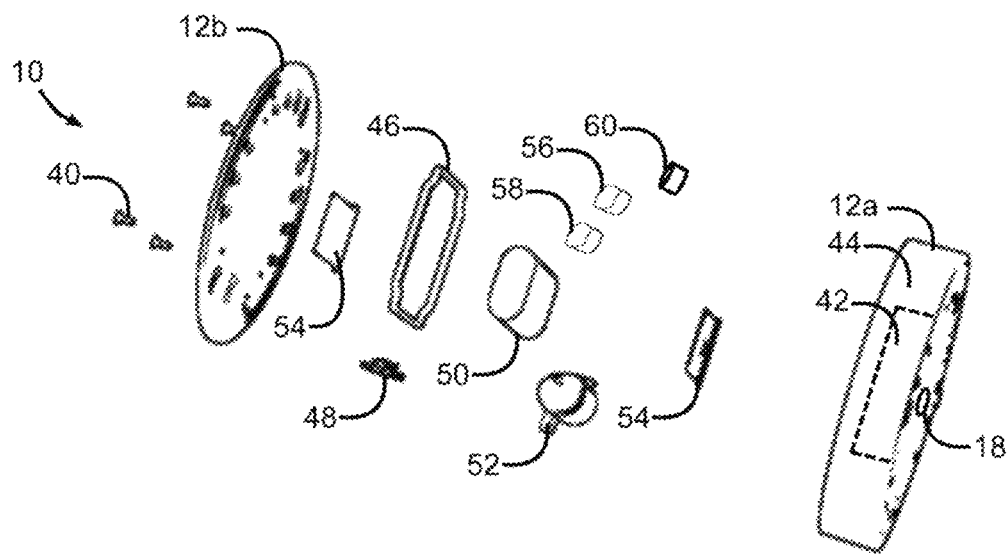
FIG. 3 is an exploded perspective view of the sous vide device of FIG. 1.
Figure 4:
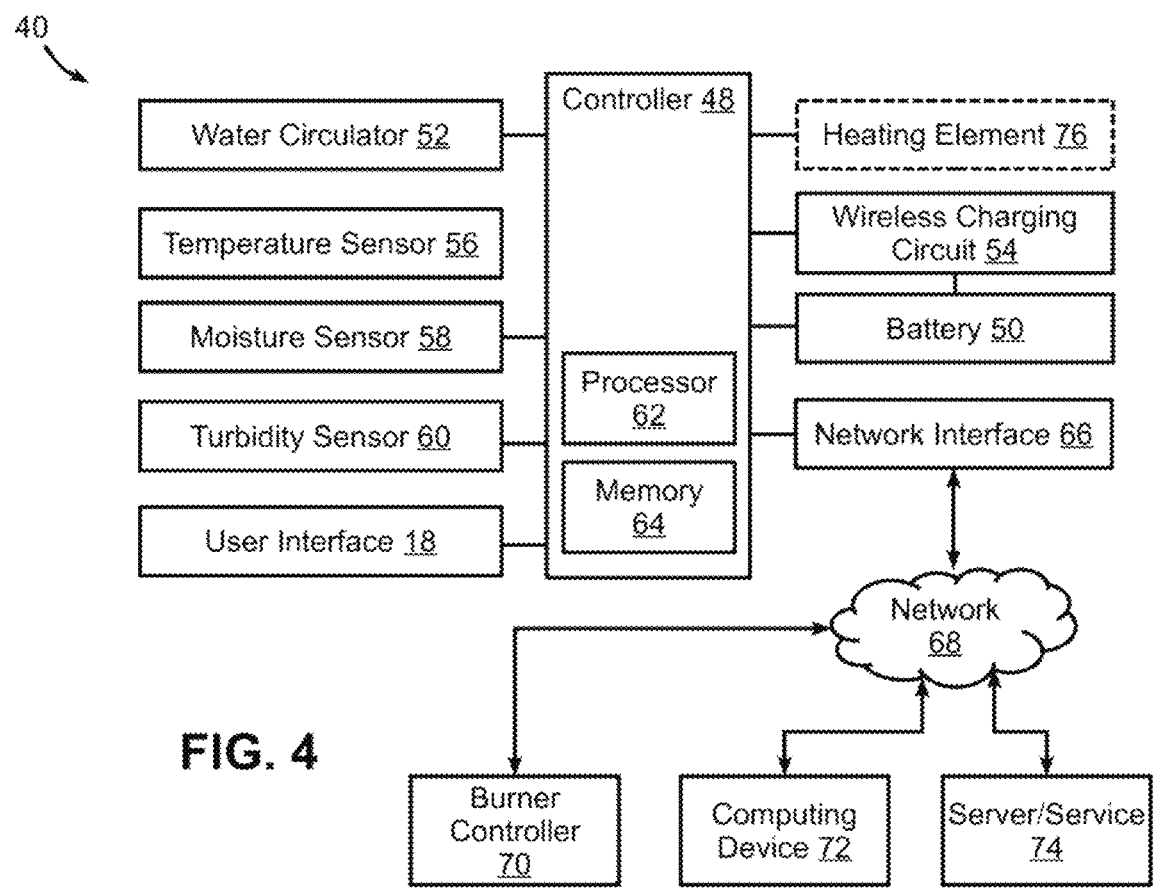
FIG. 4 is a block diagram of an example control system for the sous vide device of FIG. 1.

FIGS. 3 and 4 illustrates a number of components that may be utilized in sous vide device 10 in various embodiments of the invention. As shown in FIG. 3, for example, body 12 of sous vide device 10 may be formed from upper and lower housing components 12a, 12b, which may be formed from plastic, metal or another heat resistant and structurally rigid material, and which may be secured to one another using fasteners 40 or in other permanent or semi-permanent manners as will be appreciated by those of ordinary skill having the benefit of the instant disclosure. Housing components 12a, 12b may also include protective external surfaces formed of silicone or another pliable materials, e.g., so that device 10 may be poured out of container 20 and into a sink along with water 22 without causing damage to the device and/or to the sink. The protective external surfaces may be provided as coatings or layers applied to some or all of housing components 12a, 12b, or components 12a, 12b may be formed of a protective material in other embodiments. In other embodiments, no protective external surfaces may be used.

Lower housing component 12b may define at least portions of first and second internal chambers or cavities 42, 44. Internal cavity 42 may be sealed in use, e.g., by an O-ring or gasket 46, and may house any non-water resistant components for device 10, e.g., a controller 48, a battery 50, a non-water resistant portion of a water circulator 52 (e.g., a motor), one or more inductive couplings of a wireless charging circuit 54 (enabling charging in one or both sides of the device in different embodiments), and non-water resistant portions (if any) of various sensors, e.g., a temperature sensor 56, a moisture sensor 58 and a turbidity sensor 60. Internal cavity 44 is in fluid communication with the various ports or vents 14 such that water may circulate through cavity 44. As such, at least portions of water circulator 52 (e.g., a pump impeller, fan and/or rotating blade), temperature sensor 56, turbidity sensor 58 and moisture sensor 60 may be housed within or otherwise exposed to internal cavity 44 in some embodiments to enable water to be circulated in container 20 via ports 14, as well as to sense the temperature and turbidity of water 22 as well as detect the presence of water 22 in container 20.

It will be appreciated, however, that the placement and configuration of components in sous vide device 10 may vary in other embodiments, and that various components, e.g., sensors, electronics, batteries, etc. may be omitted from some embodiments. Therefore, the invention is not limited to the particular embodiment illustrated in FIG. 3.

FIG. 4 functionally illustrates the various electronic components in sous vide device 10 in one example embodiment of the invention. Controller 48, for example, may include one or more processors 62 and a memory 64 within which may be stored program code for execution by the one or more processors. The memory may be embedded in controller 48, but may also be considered to include volatile and/or non-volatile memories, cache memories, flash memories, programmable read-only memories, read-only memories, etc., as well as memory storage physically located elsewhere from controller 48, e.g., in a mass storage device or on a remote computer interfaced with controller 48.

As shown in FIG. 4, controller 48 may be interfaced with various components, including a user interface 18 for displaying information to a user and/or receive user input from a user (e.g., one or more status LED's as discussed above), water circulator 52 (e.g., a pump, fan/rotating blade, bubbler, etc.), temperature sensor 56, moisture sensor 58, and turbidity sensor 60. In some embodiments, battery 50 may be coupled to controller 48, and may be rechargeable or replaceable in different embodiments, or may be omitted when wireless power is available. In addition, a wireless charging circuit 54, e.g., including one or more inductive couplings, may also be coupled to controller 48 to charge battery 50 when used. Alternatively, wireless charging circuit 54 may power controller 48 without charging any battery, and may also be omitted in some embodiments.

In some embodiments, controller 48 may also include a wireless communication circuit coupled to one or more network interfaces 66, e.g., for interfacing with external devices via wired and/or wireless networks such as Ethernet, Wi-Fi, Bluetooth, NFC, cellular and other suitable networks, collectively represented in FIG. 4 at 68. Network 68 may be used to communicate control and/or status signals between sous vide device 10 and various external devices that control the operation of one or more heating elements, e.g., one or more burner controllers 70 that regulate an energy output of a burner or other external heating element such as is provided in a range, stovetop, grill (including inside and/or outside grills), hot plate or countertop cooking device, oven, etc. A burner controller 70 may control various burners such as gas burners, an electric burners, microwave elements, induction burners, etc.

Network 68 may also be used to interface with one or more external devices such as computing devices 72, e.g., various personal and/or mobile computing devices such as computers, tablets, smart phones, wearable devices, etc., and through which sous vide device 10 may be controlled and/or sous vide device 10 may provide status information, sensor readings and/or control signals to control an external heating element, e.g., device status, notifications of events, error conditions, battery status, sensed temperature, sensed moisture, sensed turbidity, water circulator status, water condition (e.g., clear, non-clear, low), etc. Further, network 58 may be used to interface with one or more additional external devices that are not personal to a particular user, e.g., a server or cloud service 74, to similarly provide and/or receive status, sensor and/or control-related data to and/or from a multi-user device or service.

Furthermore, while sous vide device 10 illustrated in FIGS. 1-3 is fully submergible and lacks its own heating element or other heating source, in other embodiments, and as represented by heating element 76 shown in dashed line in FIG. 4, a sous vide device may incorporate its own heating element. For example, in some embodiments a moisture and/or turbidity sensor may be incorporated into a sous vide device having its own internal heating source and/or being only partially-immersible in a container of water.

In some embodiments, controller 48 may operate under the control of an operating system and may execute or otherwise rely upon various computer software applications, components, programs, objects, modules, data structures, etc. In addition, controller 48 may also incorporate hardware logic to implement some or all of the functionality disclosed herein. Further, in some embodiments, the sequences of operations performed by controller 48 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-4 will be apparent to one of ordinary skill in the art, as will become apparent from the description below. Therefore, the invention is not limited to the specific implementations discussed herein.

Sous vide device 10 may, as noted above, be wirelessly rechargeable in some embodiments, and as such a charging dock may be used in some embodiments to both support and charge a sous vide device consistent with the invention. A charging dock may include a wireless charging circuit configured to wirelessly charge the rechargeable battery of the sous vide device when the sous vide device is proximate the charging dock.

Figure 5:
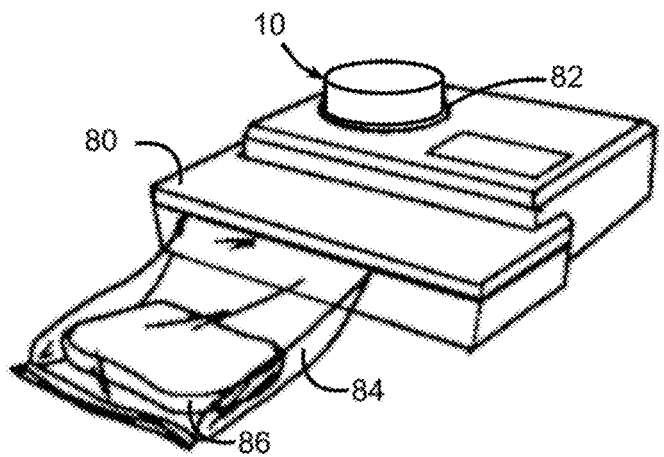
FIG. 5 is a perspective view of a vacuum sealer including a charging dock for use with the sous vide device of FIG. 1.

In some embodiments, a charging dock may be a stand-alone device having a housing sized and configured to support the sous vide device, while in other embodiments, a charging dock may be integrated into another type of device. FIG. 5, for example, illustrates a vacuum sealer 80 including an integrated charging dock 82 disposed on a top surface thereof and configured to both support and charge sous vide device 10. As vacuum sealers are commonly used to prepare bags of food items (e.g., bag 84 containing food item 86) for sous vide cooking, the integration of a charging dock into such a device provides a combined benefit for sous vide cooking. In some embodiments, charging dock 82 may include a generally disc-shaped recess in the top surface of vacuum sealer 80 to receive sous vide device 10.

Figure 6:
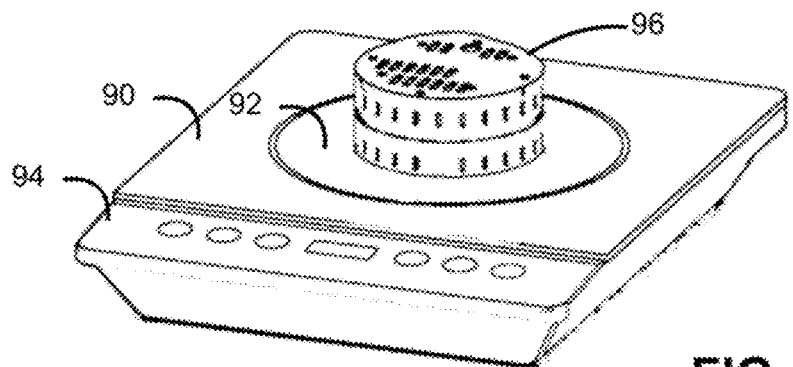
FIG. 6 is a perspective view of a hot plate including a charging dock for use with a sous vide device consistent with the invention.

Similarly, FIG. 6 illustrates a countertop cooking device or hot plate 90 including burner 92 and a burner controller 94, and supporting a sous vide device 96, which as illustrated in FIG. 6 has a different body configuration from sous vide device 10. In this embodiment, a charging dock is integrated into burner 92 or otherwise positioned to charge sous vide device 96 when placed on the burner. As will be discussed in greater detail below, an inductive coupling circuit in the charging dock may be separate from the heating element that generates cooking energy, while in other embodiments the inductive coupling circuit may include an inductive coil that serves to both wirelessly charge the sous vide device and provide the cooking energy to heat a container of water. Moreover, as illustrated in FIG. 6, a charging dock need not include a dedicated recess for supporting a sous vide device in some embodiments.

Figure 7:
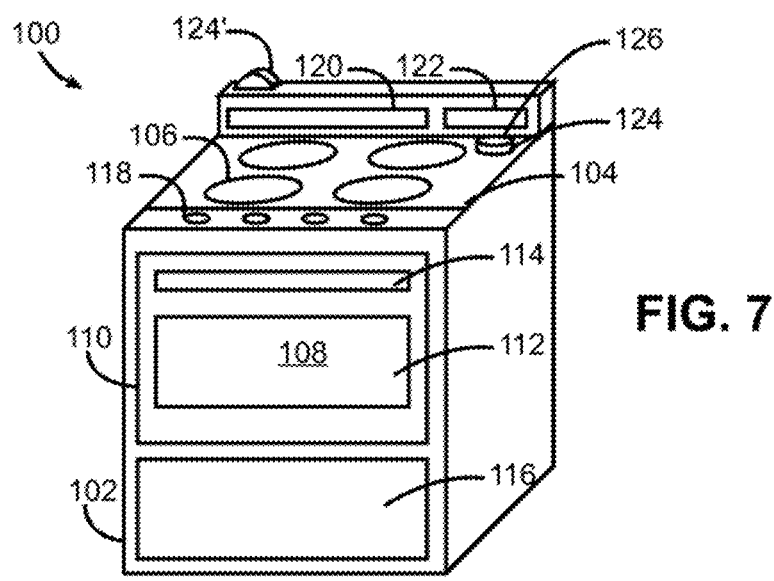
FIG. 7 is a perspective view of a range illustrating suitable locations for a charging dock for use with a sous vide device consistent with the invention.

FIG. 7 next illustrates the integration of a charging dock 124 into a cooking appliance 100, which may be, for example, a residential-type range, which includes a housing or cabinet 102, a cooktop 104 including a plurality of burners 106, and an oven 108 accessed via an oven door 110 having a window 112 and a handle 114. Cooking appliance 100 may also include a storage drawer 116 in some embodiments, or in other embodiments, may include a second oven. Various additional heating elements (not shown in FIG. 1)

may also be incorporated into cooking appliance 100 for cooking food in oven 108, e.g., one or more electric or gas heating elements.

Cooking appliance 10 may also include various user interface devices, including, for example, control knobs 118 for controlling burners 106, a control panel 120 for controlling oven 108 and/or burners 106, and a display 122 for providing visual feedback as to the activation state of the cooking appliance. It will be appreciated that cooking appliance 100 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 122 may be touch sensitive to receive user input in addition to displaying status information and/or otherwise interacting with a user. In still other embodiments, cooking appliance 100 may be controllable remotely, e.g., via a smartphone, tablet, or other networked computing device, e.g., using a web interface or a dedicated app.

Display 122 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 100 of FIG. 7 is a range, which combines both a stovetop and one or more ovens, and which in some embodiments may be a standalone or drop-in type of range. In other embodiments, however, cooking appliance 100 may be another type of cooking appliance, e.g., a wall mount or freestanding oven, a drop-in stovetop, a countertop appliance, etc. In general, a cooking appliance consistent with the invention may be considered to include any residential-type appliance including a housing and one or more cooking elements disposed thereon and/or therein and configured to generate energy for cooking food.

In turn, a heating element or burner may be considered to include practically any type of energy-producing element used in residential applications in connection with cooking food, e.g., employing various cooking technologies such as electric, gas, light, microwaves, induction, convection, radiation, etc. In the case of an oven, for example, one or more heating elements therein may be gas, electric, light, or microwave heating elements in some embodiments, while in the case of a stovetop, one or more heating elements therein may be gas, electric, or inductive heating elements in some embodiments. Further, it will be appreciated that any number of heating elements may be provided in a cooking appliance, and that multiple types of heating elements may be combined in some embodiments, e.g., combinations of microwave and light heating elements in some oven embodiments.

A cooking appliance consistent with the invention also generally includes one or more controllers configured to control the cooking elements and otherwise perform cooking operations at the direction of a user. In addition, as will become more apparent below, a controller of a cooking appliance in some embodiments may also be configured to communicate with a sous vide device and/or another computing device, server and/or service in connection with sous vide cooking consistent with the invention.

Furthermore, cooking appliance 100 may include a charging dock for charging a sous vide device consistent with the invention. While cooking appliance may include a charging dock proximate a burner 106 in some embodiments, FIG. 6 illustrates two other suitable charging dock locations. For example, a charging dock 124 may be provided on a cooking surface of cooking appliance 100 to support a sous vide device 126, but not integrated into a burner specifically. A recess may be provided in some embodiments, while in other embodiments, e.g., where a flat surface is provided on the cooking surface, the region under which the charging circuitry is disposed may simply be marked with appropriate markings.

In other embodiments, and as illustrated by charging dock 124', a sous vide device may instead be docked on a backsplash of cooking appliance 100. As is also illustrated in FIG. 7, rather than supporting a sous vide device on its flat surface, a charging dock may also include a slot for receiving the sous vide device in an alternate orientation. Other suitable locations for docking a sous vide device may be used in other embodiments, so the invention is not limited to the particular locations illustrated in FIG. 7.

Figure 8:
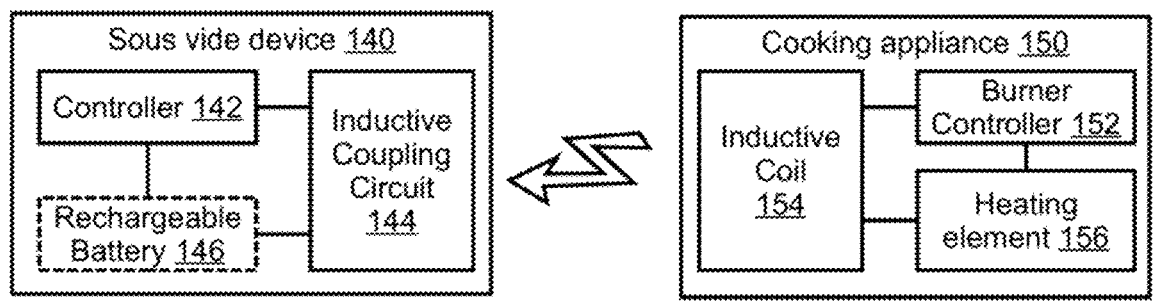
FIG. 8 is a block diagram illustrating wirelessly charging and/or powering a sous vide device during sous vide cooking consistent with the invention.

FIG. 8 next illustrates in greater detail wireless charging and/or powering of a sous vide device consistent with some embodiments of the invention. A sous vide device 140, for example, may include a controller 142 and an inductive coupling circuit 144, and optionally a rechargeable battery 146. In embodiments where wireless power is provided during sous vide cooking, battery 146 may be omitted.

A cooking appliance 150 may include a burner controller 152 and an inductive coil 154, as well as a heating element 156. Inductive coil 154 provides wireless power to inductive coupling circuit 144, and heating element 156 provides cooking energy to heat a container of water within which sous vide device 140 is disposed during sous vide cooking, and is controlled or regulated by burner controller 152.

Moreover, in embodiments where inductive cooking is used, inductive coil 154 may be configured as an inductive heating element, and a separate heating element 156 may be omitted. Further, in such embodiments, wireless power and/or wireless recharging of battery 146 may be performed concurrently with applying heat to the container of water using the inductive coil, in a manner that will be appreciated by those of ordinary skill having the benefit of the instant disclosure. Consequently, as illustrated in FIG. 2, placement of a container of water with a submerged sous vide device on a burner may both perform a sous vide cooking cycle at a precisely regulated water temperature using the sous vide device, while power and/or recharging of a battery of the sous vide device may occur simultaneously with sous vide cooking. In addition, a safety circuit may be used in some embodiments to prevent the inductive coil from overdriving the sous vide device when concurrently applying heat and powering/charging the sous vide device.

Figure 9:
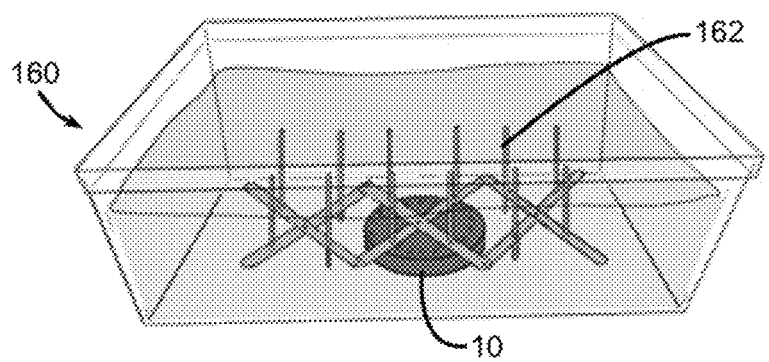
FIG. 9 is a perspective view of a container of water including a rack and a sous vide device consistent with the invention.

As noted above, different form factors may be used for a sous vide device in other embodiments. As illustrated in FIG. 9, however, the low profile of sous vide device 10 may be advantageous in many embodiments. Specifically, illustrated within a container 160 is a rack 162, which may be used to support one or more bags of food items in the container, while providing sufficient space for sous vide device 10 to rest on a bottom surface of the container. The rack 162 may include a plurality of generally vertical dividers (e.g., posts) that can be used to separate and support bags in a generally vertical orientation. In addition, in some embodiments, rack 162 may include a floor (e.g., the X-shaped members) that supports the bags, and in some instances the rack may be collapsible to reduce space requirements when not in use.

Figure 10A:
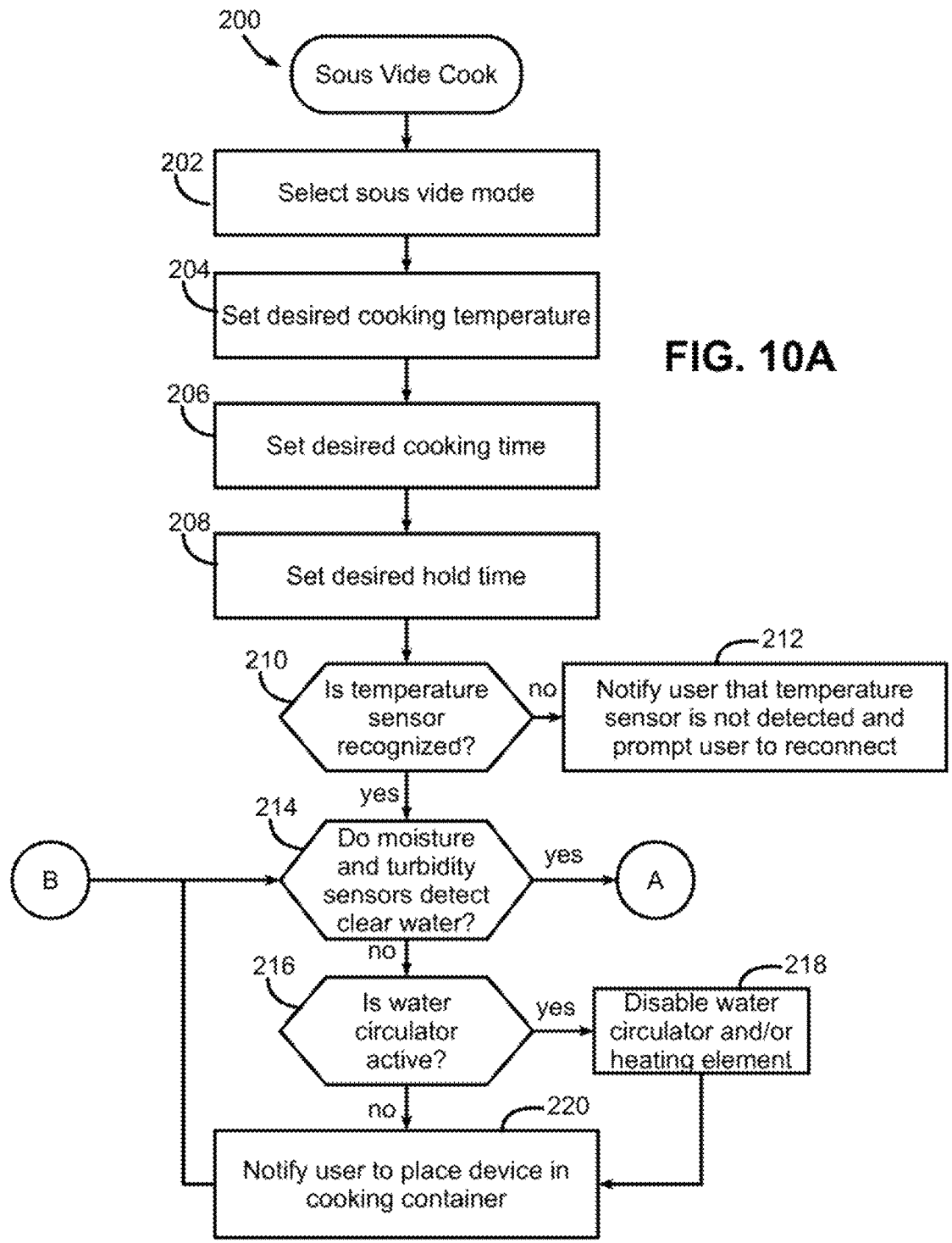
FIGS. 10A and 10B are a flowchart illustrating an example sequence of operations for controlling a sous vide device during sous vide cooking consistent with the invention.
Figure 10B:
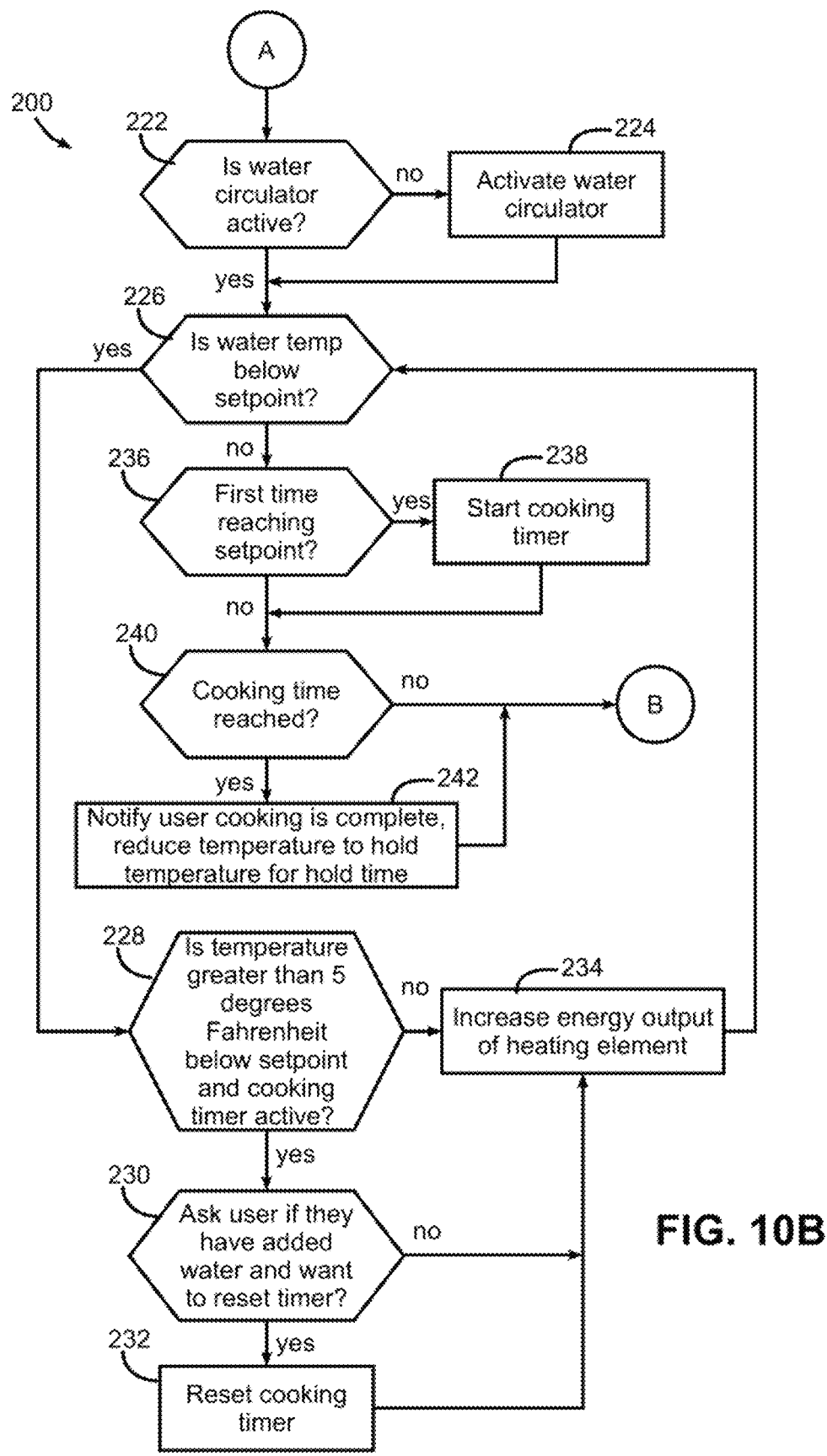

Now turning to FIGS. 10A-10B, an example sequence of operations 200 for performing a sous vide cooking cycle with a sous vide device consistent with the invention is illustrated in greater detail. In this example, it is assumed that the sous vide device interfaces with a mobile computing device and/or a burner controller to regulate the temperature of a container of water during sous vide cooking. It will be appreciated that in various embodiments user interaction may be solely through a cooking appliance or other device including a burner controller, solely through a user interface of the sous vide device, solely through a personal or mobile computing device, e.g., through an app, solely through a server or cloud service, or through any combination thereof. Moreover, depending upon whether the sous vide device sends control signals to control a burner controller, or merely provides sensor data to a burner controller, personal or mobile computing device, server or cloud service, some of the operations performed in sequence of operations 200 may be performed by the sous vide device controller, while other operations may be performed by one or more external devices, as will be appreciated by those of ordinary skill in the art having the benefit of the instant disclosure.

First, as illustrated in FIG. 10A, in block 202, a sous vide cooking mode is selected, and then in blocks 204, 206 and 208 a cooking temperature, and optionally a cooking time and/or hold time are set, e.g., based on user input. The cooking temperature may be input based upon a numerical input, or may be input based upon the type of food (e.g., setting a temperature of 130 degrees Fahrenheit based upon a user input of a medium rare steak. The cooking time refers to the amount of time to hold the cooking temperature, and may be entered manually or may be determined based on the type of food being cooked, while the hold time refers to the amount of time to hold at a reduced temperature after the cooking time is complete.

Block 210 next determines if the temperature sensor is recognized, e.g., if the cooking appliance, mobile computing device or other external device is in communication with the sous vide device and able to receive temperature data, or if the sous vide device controller is receiving temperature information from the sensor. If not, control passes to block 212 to notify a user that the temperature sensor is not recognized, and to prompt the user to reconnect the temperature sensor. For example, block 212 may be implemented by a mobile computing device app or by a burner controller to prompt the user to re-pair with the sous vide device.

In some embodiments, for example, it may be desirable to have a device automatically pair with an external device upon initial power on, or even upon detection of the presence of water with the moisture sensor. In some instances, it may be desirable to require the device to be set to a pair mode when first used to set up the connection with the device and then enable automatic pairing in subsequent uses. In some embodiments, for example, a pair mode may be selected through a pin hole activation/reset button on the device.

If the temperature sensor is recognized, control passes to block 214 to determine if the moisture sensor is detecting water and the turbidity sensor is detecting clear water. If either an absence of moisture is detected by the moisture sensor, or a non-clear liquid is detected by the turbidity sensor, control passes to block 216 to determine if the water circulator is active (i.e., a pump or fan is currently turned on), and if so, control is passed to block 218 to disable and turn off the water circulator, thereby preventing the water circulator from running without being submerged in water or when submerged in a non-clear liquid. In addition, if an external heating element is currently active, it may be desirable to notify a burner controller to disable the heating element in some embodiments, e.g., by sending a control signal to the burner controller, so that the heating element does not heat an empty container.

After disabling the water circulator and/or heating element in block 218, or if the water circulator was determined to not be active, block 220 notifies the user to place the sous vide device in a container of water, and control returns to block 214 to wait until moisture has been detected.

Once moisture has been detected, block 214 passes control to block 222 (FIG. 10B) to determine if the water circulator is active, and if not, control passes to block 224 to activate or turn on the water circulator to begin circulating water in the container. After activating the water circulator in block 224, or if the water circulator was already determined to be active, block 226 determines whether the current water temperature sensed by the temperature sensor is below the setpoint, and if so, control passes to block 228 to determine if the temperature sensor is more than a predetermined amount (e.g., about 5 degrees, although smaller or larger thresholds may be used), as well as if the cooking timer has already been started. If so, a possibility exists that water has been added to the container and dropped the temperature a significant amount, so control passes to block 230 to query the user if they have added water and want to reset the cooking timer. If so, the cooking timer is reset in block 232, and control passes to block 234 to increase the energy output of the heating element. As discussed above, such an operation may be performed responsive to a control signal from a sous vide device, or from a control signal from an external device to a burner controller, or by the burner controller itself. In addition, if either of the queries in blocks 228 and 230 is negative, control passes directly to block 234.

After increasing the output of the heating element in block 234, control returns to block 226 to wait until the temperature setpoint is reached, at which point control passes to block 236 to determine if this is the first time reaching the setpoint during the present sous vide cooking cycle. If so, control passes to block 238 to start the cooking timer, and if not, block 238 is bypassed. Block 240 then determines if the cooking time has been reached, and if not control returns to block 214 of FIG. 10A to continue the sous vide cooking cycle, with both the moisture sensor and turbidity sensor monitoring the presence/absence and clarity of the container of water such that either an absence of water or the presence of a non-clear liquid in the container of water (which could be due to a bag leak) being automatically detected and used to control the activation state of the water circulator and/or external heating element.

Returning to block 240 of FIG. 10B, if the cooking time has been reached, control passes to block 242 to notify the user and reduce the temperature setpoint to the hold temperature for the hold time set in block 208 of FIG. 10A. Control then returns to block 214, e.g., until the user shuts off or disconnects from the sous vide device once cooking is complete.

It will be appreciated that the sequence of operations illustrated in FIGS. 10A-10B may also be used in connection with sous vide devices incorporating an internal heating element and water circulator in combination with a turbidity sensor and/or a moisture sensor to control the activation state of the heating element and/or water circulator responsive to the turbidity and/or moisture sensors, e.g., to disable a heating element and/or water circulator when no water is detected and/or when a non-clear liquid is detected (e.g., when the device is used in a non-clear liquid or when a bag of food ruptures or leaks). In addition, the sensors may be usable to restrict starting of a sous vide cooking cycle when requested by a user. Further, detection of water by a moisture sensor may also be used in some embodiments to automatically start a sous vide cooking cycle with a sous vide device consistent with the invention.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A sous vide device, comprising:
a fully submergible body shaped and configured for full submersion in a container of water during sous vide cooking, the body including a battery, water circulator, moisture sensor, and temperature sensor, wherein the body includes an external surface and first and second internal cavities, the external surface including one or more ports defined therein, wherein the first internal cavity is sealed and houses the battery and the second internal cavity is in fluid communication with the one or more ports, wherein the temperature sensor is exposed to the second internal cavity to sense a temperature of water within the second internal cavity, and wherein the water circulator is exposed to the second internal cavity to circulate water through the one or more ports; and
a controller disposed within the first internal cavity of the body, the controller coupled to the moisture sensor, the temperature sensor and the water circulator and powered by the battery, and the controller including a wireless communication circuit;
wherein the controller is configured to actuate the water circulator to circulate water when the body is submerged in the container of water and to wirelessly communicate with an external device using the wireless communication circuit; and
wherein the controller is further configured to determine that the moisture sensor has sensed moisture and to automatically initiate pairing with the external device to establish a wireless connection with the external device and thereby enable wireless data communication with the external device using the wireless communication circuit in response to the determination that moisture has been sensed with the moisture sensor.

2. The sous vide device of claim 1, wherein the body further comprises a turbidity sensor, and wherein the controller is coupled to the turbidity sensor to disable the water circulator in response to detecting immersion in a non-clear liquid.

3. The device of claim 1, wherein the body is puck-shaped, and wherein the body includes one or more protective external surfaces formed of silicone to protect a sink when the body is dumped from the container of water after cooking.

4. The device of claim 1, wherein the water circulator comprises a pump or a rotating blade.

5. The device of claim 1, further comprising a wireless charging circuit disposed in the body such that the battery is wirelessly rechargeable.

6. The device of claim 1, wherein the controller is configured to wirelessly communicate with the external device using the wireless communication circuit to communicate a water temperature sensed by the temperature sensor to the external device.

7. The device of claim 1, wherein the controller is configured to wirelessly communicate with and pair with a mobile computing device, a personal computing device, a server or a cloud service.

8. The device of claim 1, wherein the controller is configured to wirelessly communicate with and pair with a burner controller to regulate an energy output of a burner that heats the container of water, and wherein the burner and burner controller are disposed in a range, a stovetop, an oven, a grill or a countertop cooking device, and wherein the burner is a gas burner, an electric burner, a microwave element, or an induction burner.

9. The device of claim 1, wherein the controller is configured to control activation of the water circulator based in part on moisture sensed by the moisture sensor.

10. The device of claim 1, wherein the body includes one or more feet configured to support the device on a bottom surface of the container while allowing for water to circulate between the body and the bottom surface.

11. An apparatus, comprising:
a sous vide device, the sous vide device comprising:
a fully submergible body shaped and configured for full submersion in a container of water during sous vide cooking, the body including a rechargeable battery, water circulator, moisture sensor, and temperature sensor, wherein the body includes an external surface and first and second internal cavities, the external surface including one or more ports defined therein, wherein the first internal cavity is sealed and houses the battery and the second internal cavity is in fluid communication with the one or more ports, wherein the temperature sensor is exposed to the second internal cavity to sense a temperature of water within the second internal cavity, and wherein the water circulator is exposed to the second internal cavity to circulate water through the one or more ports; and
a controller disposed within the first internal cavity of the body, the controller coupled to the moisture sensor, the temperature sensor and the water circulator and powered by the battery, and the controller including a wireless communication circuit;
wherein the controller is configured to actuate the water circulator to circulate water when the body is submerged in the container of water and to wirelessly communicate with an external device using the wireless communication circuit; and
wherein the controller is further configured to determine that the moisture sensor has sensed moisture and to automatically initiate pairing with the external device to establish a wireless connection with the external device and thereby enable wireless data communication with the external device using the wireless communication circuit in response to the determination that moisture has been sensed with the moisture sensor; and
a charging dock including a wireless charging circuit configured to wirelessly charge the rechargeable battery when the sous vide device is proximate the charging dock.

12. The apparatus of claim 11, further comprising a cooking appliance, wherein the cooking appliance comprises a stovetop or a range, and wherein the charging dock is disposed on a cooking surface of the cooking appliance.

13. The apparatus of claim 11, further comprising a cooking appliance, wherein the cooking appliance comprises a stovetop or a range, and wherein the charging dock is disposed on a backsplash of the cooking appliance.

14. The apparatus of claim 11, further comprising a countertop cooking device, wherein the charging dock is disposed on the countertop cooking device.

15. The apparatus of claim 11, further comprising a grill, wherein the charging dock is disposed on the grill.

16. The apparatus of claim 11, wherein the sous vide device is puck-shaped and wherein the charging dock includes a disc-shaped recess sized and configured to support the sous vide device during charging.

17. The apparatus of claim 11, further comprising a burner, wherein the charging dock is disposed on the burner.

18. The apparatus of claim 11, wherein the charging dock includes a stand-alone housing sized and configured to support the sous vide device while charging.

19. The apparatus of claim 17, wherein the burner includes an inductive heating element configured to wirelessly charge the rechargeable battery and/or power the controller of the sous vide device concurrently with heating a container of water within which the sous vide device is submerged.

20. The apparatus of claim 11, further comprising a vacuum sealer, wherein the charging dock is disposed on a surface of the vacuum sealer.

\* \* \* \* \*